(12) United States Patent
Xu

(10) Patent No.: US 8,231,162 B2
(45) Date of Patent: Jul. 31, 2012

(54) CLAMP MECHANISM

(75) Inventor: Zhen-Hua Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 0 days.

(21) Appl. No.: 13/173,125

(22) Filed: Jun. 30, 2011

(65) Prior Publication Data
US 2012/0068484 A1   Mar. 22, 2012

(30) Foreign Application Priority Data
Sep. 16, 2010   (CN) .......................... 2010 1 0285083

(51) Int. Cl.
*B66C 1/42* (2006.01)
(52) U.S. Cl. ...................................... 294/207; 294/119.1
(58) Field of Classification Search ............... 294/103.1, 294/104, 207, 119.1, 901, 902; 269/32, 34, 269/234; 901/37, 39
See application file for complete search history.

(56) References Cited

U.S. PATENT DOCUMENTS

| | | | | | |
|---|---|---|---|---|---|
| 3,287,057 | A | * | 11/1966 | Gallapoo | 294/119.1 |
| 4,723,806 | A | * | 2/1988 | Yuda | 294/119.1 |
| 4,913,481 | A | * | 4/1990 | Chin et al. | 294/207 |
| 6,471,200 | B2 | * | 10/2002 | Maffeis | 269/34 |

* cited by examiner

*Primary Examiner* — Paul T Chin
(74) *Attorney, Agent, or Firm* — Altis Law Group, Inc.

(57) ABSTRACT

A clamp mechanism includes a base defining two first sliding grooves, a sliding member slidable relative to the base and two second sliding grooves corresponding to the first sliding grooves respectively, a pair of first connecting members slidably received in the first sliding grooves respectively, a pair of second connecting members slidably received in the second sliding grooves respectively, a first clamp member connected to one first connecting member and one second connecting member, a second clamp member connected to the other first connecting member and the other second connecting member, an impelling member fixed to the sliding member; and a driver capable of driving the sliding member along with the first and second clamp members to move toward or away from each other in order to clamp or release an object, and the impelling member capable of removing the object when the object is released.

20 Claims, 3 Drawing Sheets

CLAMP MECHANISM

BACKGROUND

1. Technical Field

The present disclosure relates to a clamp mechanism.

2. Description of Related Art

In an automatic production line, there are various types of clamp mechanisms for clamping and positioning workpieces. A commonly used clamp mechanism is connected to a robot arm, and the robot arm may drive the clamp mechanism to clamp, release or position an object. The commonly used clamp mechanism may include a first clamp member, a second clamp member capable of moving toward and away from the first clamp member, and a driver for driving the two clamp members to clamp or release the object. However, the object cannot be easily detached from the two clamp members because of the adhesive force between the object and the two clamp members.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of clamp mechanism. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
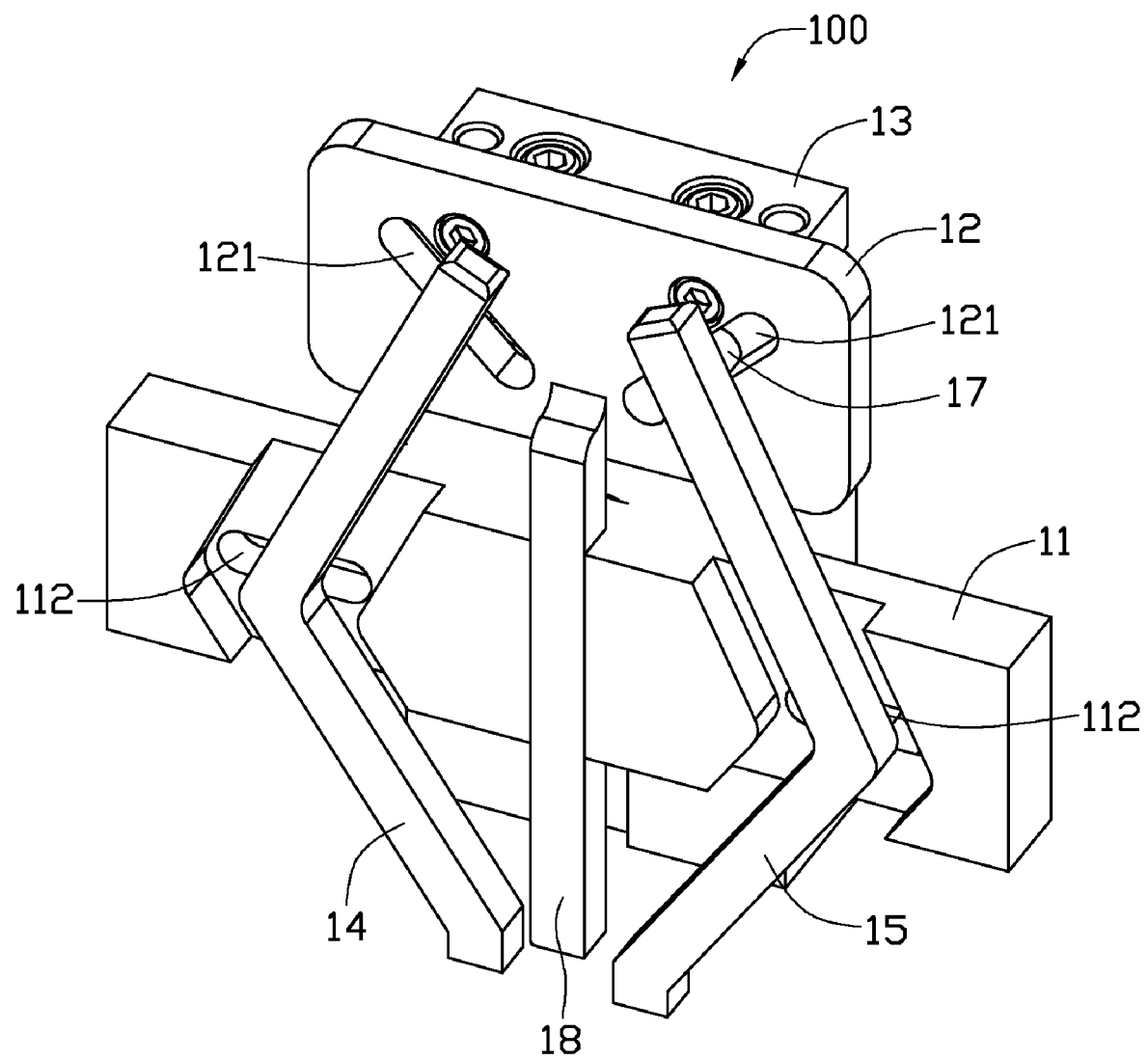
FIG. 1 is an assembled, isometric view of an embodiment of a clamp mechanism.
Figure 2:
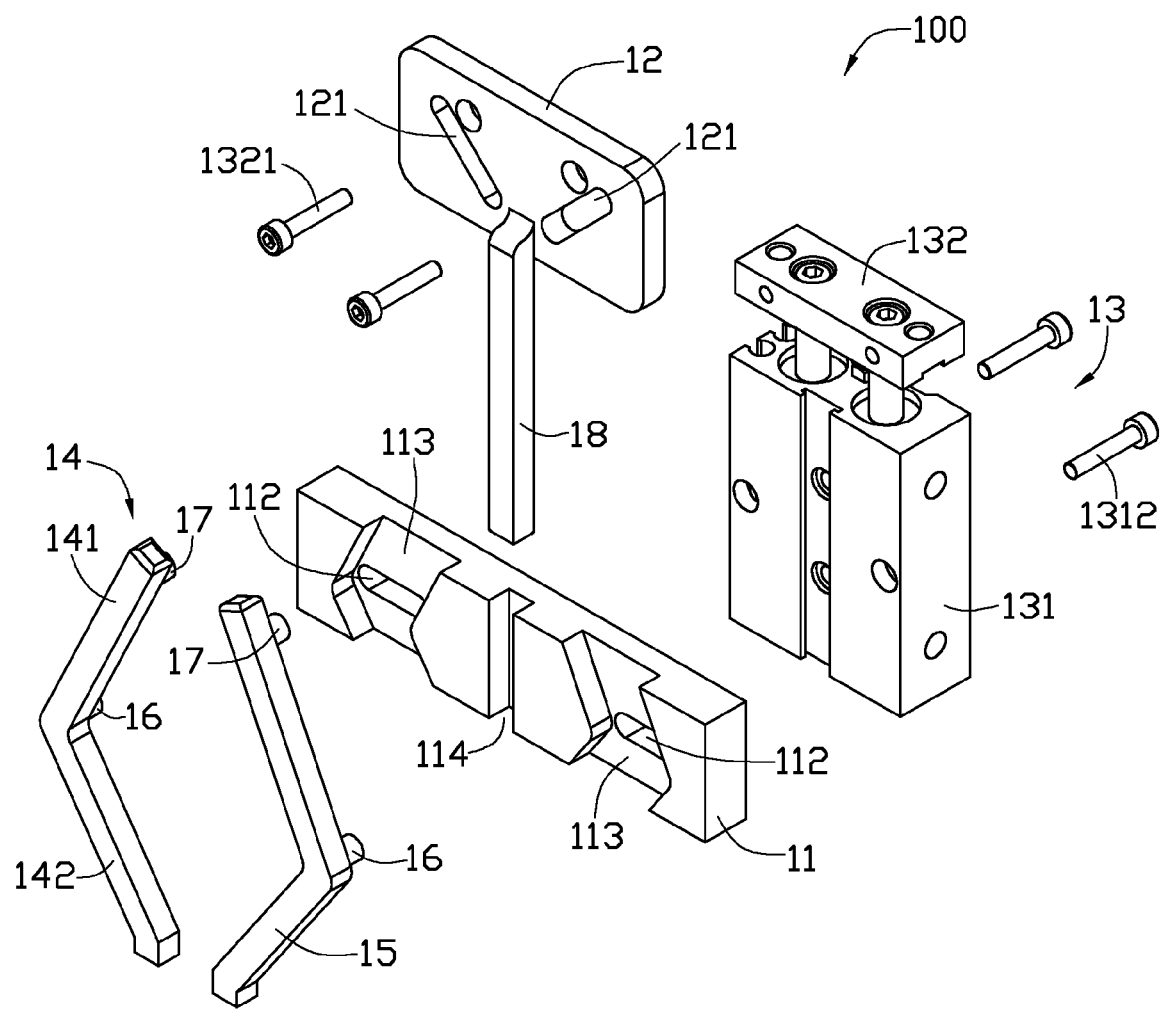
FIG. 2 is an exploded, isometric view of the clamp mechanism of FIG. 1.

Referring to FIGS. 1 and 2, an embodiment of an clamp mechanism 100 includes a base 11, a sliding member 12 capable of moving relative to the base 11, a linear driver 13 for driving the sliding member 12, a first clamp member 14 and a second clamp member 15 opposite to the first clamp member 14.

The base 11 defines two first sliding grooves 112 which are symmetrically disposed horizontally. The sliding member 12 defines two second sliding grooves 121 which are symmetrical. The two second sliding grooves 121 are corresponding to the two first sliding grooves 112, respectively. The clamp mechanism 100 further includes two first connecting members 16 slidably received in the first sliding grooves 112, two second connecting members 17 slidably received in the second sliding grooves 121, and an impelling member 18 fixed to the sliding member 12. Each of the first and second clamp members 14, 15 is connected to one first connecting member 16 and one second connecting member 17, respectively. When the linear driver 13 drives the sliding member 12 to move linearly, the first and second connecting members 16, 17 will respectively slide in the first and second sliding grooves 112, 121, such that the two clamp members 14, 15 move toward or away from each other to clamp or release an object.

In one embodiment, the base 11 is a substantially rectangular plate and defines two receiving grooves 113 communicating with the first sliding grooves 112, respectively, and a guiding groove 114 positioned between the two first sliding grooves 112. The receiving grooves 113 and the guiding groove 114 extend along the moving direction of the sliding member 12 and run through opposite side surfaces of the base 11. The first sliding grooves 112 extend toward a direction substantially perpendicular to the moving direction of the sliding member 12. The second sliding grooves 121 are arranged at an oblique angle relative to the first sliding grooves 112, and cooperatively forming a "V" shape.

The impelling member 18 has a bar shape and extends linearly from one side of the sliding member 12 toward the base 11. The impelling member 18 slidably engages in the guiding groove 114. The two second sliding grooves 121 are symmetrically located relative to the impelling member 18. The impelling member 18 and the sliding member 12 are integrally formed. It is to be understood that the impelling member 18 and the sliding member 12 may be fixed to each other by welding or with a plurality of screws.

The first clamp member 14 is similar to the second clamp member 15. The first clamp member 14 and the second clamp member 15 are symmetrically configured relative to the moving direction of the sliding member 12. The first clamp member 14 includes a first connecting rod 141 and a second connecting rod 142 connected to the first connecting rod 141. The first connecting rod 141 is oblique to the second connecting rod 142 and cooperatively form a "(" shape. The ends of the first connecting rod 141 and the second connecting rod 142 are joined together and are received in the receiving grooves 113. The free end of the second connecting rod 142 is used for clamping an object.

The first connecting member 16 is fixed to the ends of the first connecting rod 141 and the second connecting rod 142 that are joined together. The second connecting member 17 is fixed to the free end of the first connecting rod 141. In the embodiment, the first and second connecting members 16, 17 are a plurality of cylindrical pins. It is to be understood that the first and second connecting members 16, 17 may be of other shapes, and can slide along the first and second sliding grooves 112, 121 to restrict the movement of the first and second clamp members 14, 15.

The impelling member 18 is positioned between the first and second clamp members 14, 15. The free end of the impelling member 18 is adjacent to the free end of the second connecting rod 142. It is to be understood that the first and second clamp members 14, 15 may be asymmetrically configured due to the different objects for clamping.

Because the first and second clamp members 14, 15 are partially received in the receiving grooves 113 and the impelling member 18 is received in the guiding groove 114, such that the first and second clamp members 14, 15 and the impelling member 18 are substantially located in one plane, thereby allowing the clamp mechanism 100 to be more compact.

The linear driver 13 includes a cylinder 131 fixed to the base 11 and a third connecting member 132 driven by the cylinder 131. In the illustrated embodiment, the cylinder 131 is fixed to the base 11 via a plurality of threaded members 1312. The third connecting member 132 is fixed to the sliding member 12 via a plurality of threaded members 1321. The linear driver 13 and the first, second clamp members 14, 15 are symmetrically fixed to opposite side surfaces of the base 11. It is to be understood that the linear driver 13 is not limited thereto, it may also be configured in other types of structures such as rack-pinion, or a screw-bolt.

Figure 3:
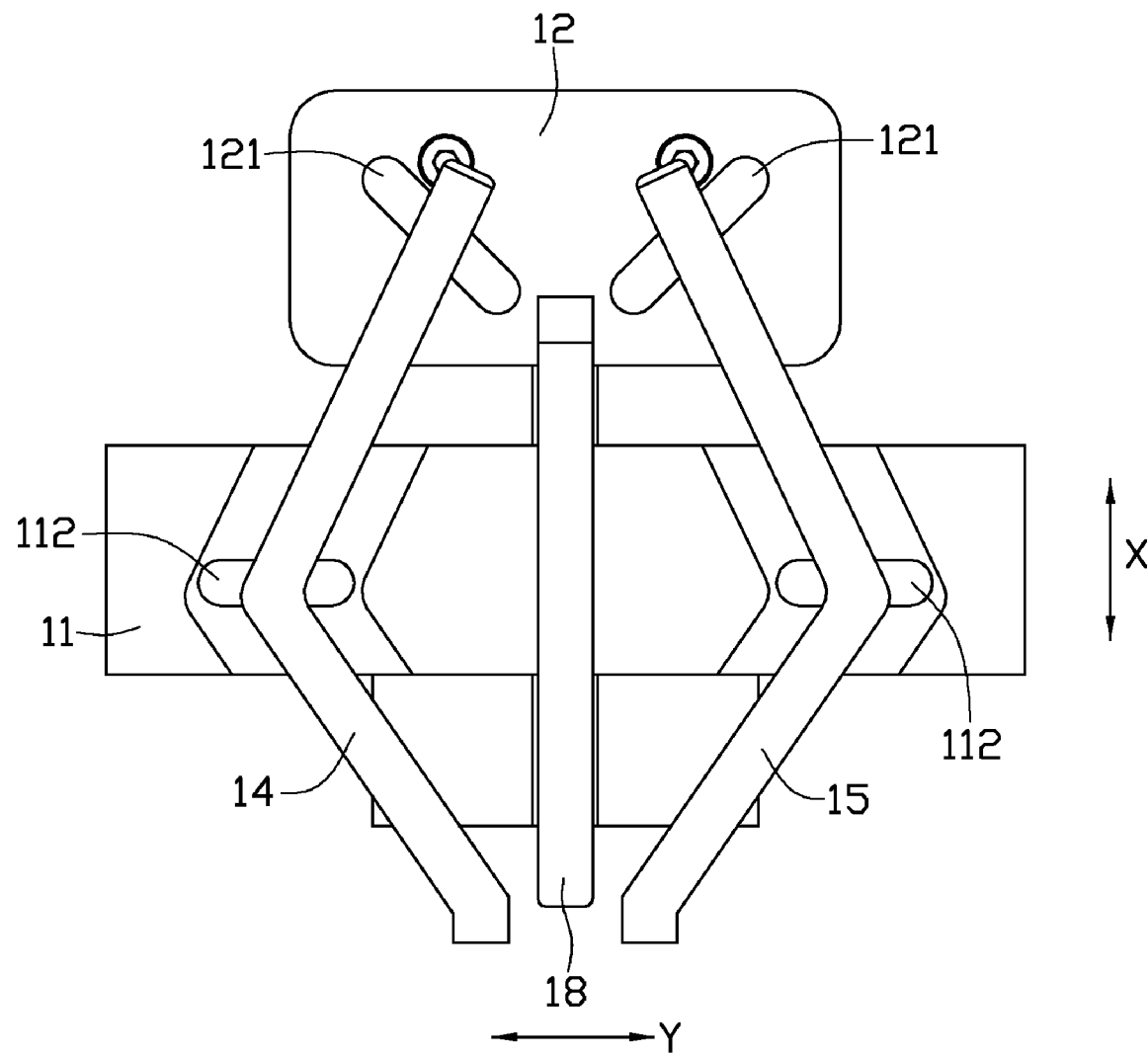
FIG. 3 is a plane view of the clamp mechanism of FIG. 1.

Referring to FIG. 3, when in use, the linear driver 13 drives the sliding member 12 to move upward along the X direction relative to the base 11, the impelling member 18 also moves upward at the same time, and the first and second clamp members 14, 15 move toward each other along the Y direction to clamp an object because of constricting effects from moving along the first, second sliding grooves 112, 121 by the first, second connecting members 16, 17. When the linear driver 13 drives the sliding member 12 to move downward along the X direction relative to the base 11, the first and second clamp members 14, 15 move away from each other to release an object from clamping at the same time, the impelling member 18 moves downward to remove the object from clamping. Thus, the movement of the impelling member 18 along the X direction and the movement of the two clamp members 14, 15 along the Y direction are achieved simultaneously. The clamp mechanism 100 releases and removes an object at the same time, thus the object can be detached from the clamp mechanism 100 easily. Moreover, the clamp mechanism 100 is simple and the operation is convenient.

It is to be understood that the shape of the first and second sliding grooves 112, 121 may be changed and the trajectory of the first and second clamp members 14, 15 may also be changed correspondingly, such that the clamp mechanism 100 can clamp different objects.

It is to be understood that the present disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clamp mechanism, comprising:
    a base defining two first sliding grooves;
    a sliding member slidable relative to the base and defining two second sliding grooves which are corresponding to the first sliding grooves, respectively;
    a pair of first connecting members slidably received in the first sliding grooves respectively;
    a pair of second connecting members slidably received in the second sliding grooves respectively;
    a first clamp member connected to one first connecting member and one second connecting member;
    a second clamp member connected to the other first connecting member and the other second connecting member;
    an impelling member fixed to the sliding member; and
    a driver capable of driving the sliding member to drive the first, second clamp members to move toward or away from each other to clamp or release an object, respectively, and the impelling member capable of removing the object when releasing the object.

2. The clamp mechanism of claim 1, wherein the first sliding grooves, the second sliding grooves, the first and second clamp members are symmetrically configured relative to the moving direction of sliding member, and the impelling member is positioned between the first and second clamp members.

3. The clamp mechanism of claim 1, wherein the first sliding grooves are substantially perpendicular to the moving direction of the sliding member, and the second sliding grooves are arranged at an oblique angle relative to the first sliding grooves and cooperatively forming a "V" shape.

4. The clamp mechanism of claim 1, wherein the driver is a linear driver and comprises a cylinder fixed to the base, a third connecting member driven by the cylinder, and the third connecting member is fixed to the sliding member.

5. The clamp mechanism of claim 1, wherein the impelling member extends linearly, the base further defines a guiding groove, the impelling member slidably engages in the guiding groove, and the second sliding grooves are symmetrically located relative to the impelling member.

6. The clamp mechanism of claim 1, wherein the base further defines a pair of receiving grooves communicating with the first sliding grooves respectively, the first and second clamp members are partially received in the corresponding receiving grooves respectively.

7. The clamp mechanism of claim 6, wherein the first and second clamp members both have a "(" shape.

8. The clamp mechanism of claim 1, wherein the sliding member and the impelling member are integrally formed.

9. The clamp mechanism of claim 1, wherein the driver is located on a first side surface of the base, the first and second clamp members are positioned on a second side surface of the base opposite to the first side surface.

10. The clamp mechanism of claim 1, wherein the first and second clamp members and the impelling member are substantially located in one plane.

11. A clamp mechanism comprising:
    a base defining two first sliding grooves horizontally and a guiding groove substantially perpendicular to the sliding grooves;
    a sliding member slidable relative to the base and defining two second sliding grooves arranged at an oblique angle relative to the first sliding grooves;
    a pair of first connecting members slidably received in the first sliding grooves respectively;
    a pair of second connecting members slidably received in the second sliding grooves respectively;
    a first clamp member connected to one first connecting member and one second connecting member;
    a second clamp member connected to the other first connecting member and the other second connecting member;
    an impelling member fixed to the sliding member and slidably engaging in the guiding groove, the impelling member being positioned between the first and second clamp members; and
    a linear driver capable of driving the sliding member to drive the first, second clamp members to move along the first, second sliding grooves such that the first, second clamp members move toward or away from each other to clamp or release an object, and the impelling member capable of moving upward away from the object or downward toward the object when clamping or both releasing and removing the object, respectively.

12. The clamp mechanism of claim 11, wherein the first sliding grooves, the second sliding grooves, the first and the second clamp members are symmetrically configured relative to the moving direction of the sliding member.

13. The clamp mechanism of claim 11, wherein the first sliding grooves are substantially perpendicular to the moving direction of the sliding member, and the second sliding grooves are arranged at an oblique angle relative to the first sliding grooves and cooperatively forming a "V" shape.

14. The clamp mechanism of claim 11, wherein the linear driver comprises a cylinder fixed to the base and a third connecting member driven by the cylinder, and the third connecting member is fixed to the sliding member.

15. The clamp mechanism of claim 11, wherein the impelling member extends linearly, and the second sliding grooves are symmetrically located relative to the impelling member.

16. The clamp mechanism of claim 11, wherein the base further defines a pair of receiving grooves communicating with the first sliding grooves respectively, and the first and second clamp member are partially received in the corresponding receiving grooves respectively.

17. The clamp mechanism of claim 16, wherein the first and second clamp members both have a "(" shape.

18. The clamp mechanism of claim 11, wherein the sliding member and the impelling member are integrally formed.

19. The clamp mechanism of claim 11, wherein the linear driver is located on a first side surface of the base, and the first and second clamp members are positioned on a second side surface of the base opposite to the first side surface.

20. The clamp mechanism of claim 11, wherein the first and second clamp members and the impelling member are substantially located in one plane.

* * * * *